US012731907B2

(12) United States Patent
Inaoka et al.

(10) Patent No.: US 12,731,907 B2
(45) Date of Patent: Sep. 8, 2026

(54) GLASS BODY HAVING ENHANCED HEAT INSULATING PERFORMANCE

(71) Applicant: NIPPON SHEET GLASS COMPANY, LIMITED, Tokyo (JP)

(72) Inventors: Daisuke Inaoka, Tokyo (JP); Akira Fujisawa, Tokyo (JP); Takahiro Asai, Tokyo (JP); Katsuki Ishikawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 245 days.

(21) Appl. No.: 18/686,490

(22) PCT Filed: Jul. 28, 2022

(86) PCT No.: PCT/JP2022/029090

§ 371 (c)(1),
(2) Date: Feb. 27, 2025

(87) PCT Pub. No.: WO2023/032535

PCT Pub. Date: Mar. 9, 2023

(65) Prior Publication Data

US 2025/0219295 A1 Jul. 3, 2025

(30) Foreign Application Priority Data

Sep. 6, 2021 (JP) ................................ 2021-144789

(51) Int. Cl.
*H01Q 15/00* (2006.01)
*C03C 17/36* (2006.01)
(Continued)

(52) U.S. Cl.
CPC ......... *H01Q 15/0013* (2013.01); *C03C 17/36* (2013.01); *C03C 17/366* (2013.01);
(Continued)

(58) Field of Classification Search
CPC .............. H01Q 1/1271; H01Q 15/0013; B32B 2605/006; C03C 17/36; E06B 3/6715–6722
See application file for complete search history.

(56) References Cited

U.S. PATENT DOCUMENTS 6,356,236 B1 * 3/2002 Maeuser ........... B32B 17/10761
343/873
6,860,081 B2 * 3/2005 Walton ...................... E06B 7/28
52/786.11
(Continued)

FOREIGN PATENT DOCUMENTS

CN 115557711 A * 1/2023 ............ C03C 17/23
FI 20165763 A7 4/2018
(Continued)

*Primary Examiner* — Ab Salam Alkassim, Jr.
(74) *Attorney, Agent, or Firm* — SZDC Law PC

(57) ABSTRACT

A glass body includes a first glass plate configured to have a first surface and a second surface. At least one plate surface of the first surface and the second surface includes a plurality of radio wave transmission regions through which radio waves are allowed to be transmitted and which is spaced apart from each other, and a conductive film region that is entirely coated with a conductive film having a blocking property for the radio waves around the radio wave transmission regions. A patterning part having a plurality of radio wave passage sections through which radio waves are allowed to pass and which is spaced apart from each other, and a conductive film section in which the conductive film is formed between the radio wave passage sections adjacent to each other is formed in each of the radio wave transmission regions.

9 Claims, 5 Drawing Sheets

(51) Int. Cl.
*E06B 3/66* (2006.01)
*E06B 3/67* (2006.01)

(52) U.S. Cl.
CPC .............. *E06B 3/66* (2013.01); *E06B 3/6715* (2013.01); *B32B 2605/006* (2013.01)

(56) References Cited

U.S. PATENT DOCUMENTS

| | | | | |
|---|---|---|---|---|
| 9,878,597 | B2 * | 1/2018 | Rousselet | B32B 17/10183 |
| 10,355,721 | B2 * | 7/2019 | Völkel | H01Q 15/0013 |
| 10,741,928 | B2 * | 8/2020 | Niembro | C03C 17/23 |
| 12,164,127 | B2 * | 12/2024 | Morita | C03C 3/087 |
| 12,500,338 | B2 * | 12/2025 | Lee | H01Q 1/1271 |
| 2003/0080909 | A1 * | 5/2003 | Voeltzel | H01Q 15/0013 343/713 |
| 2004/0107641 | A1 * | 6/2004 | Walton | E06B 7/28 49/50 |
| 2004/0200821 | A1 * | 10/2004 | Voeltzel | H05B 3/86 219/203 |
| 2007/0159395 | A1 * | 7/2007 | Sievenpiper | H01Q 9/30 343/909 |
| 2015/0229030 | A1 * | 8/2015 | Dai | C03C 27/10 219/203 |
| 2015/0343884 | A1 * | 12/2015 | Rousselet | B60J 1/002 359/360 |
| 2016/0374150 | A1 * | 12/2016 | Guillaume | B32B 17/10174 |
| 2020/0048958 | A1 * | 2/2020 | Kum | B32B 17/10055 |
| 2021/0129495 | A1 * | 5/2021 | Asai | B32B 17/10036 |
| 2021/0191011 | A1 * | 6/2021 | Morita | B32B 17/10036 |
| 2022/0127189 | A1 * | 4/2022 | Radu | C03C 23/0025 |
| 2022/0131273 | A1 * | 4/2022 | Radu | C03C 17/3681 |
| 2022/0396989 | A1 * | 12/2022 | Inaoka | C03C 17/3644 |
| 2025/0179872 | A1 * | 6/2025 | Inaoka | B32B 17/00 |

FOREIGN PATENT DOCUMENTS

| | | | | |
|---|---|---|---|---|
| JP | 2000-226235 | A | 8/2000 | |
| JP | 2016-506308 | A | 3/2016 | |
| JP | 20175-10022 | A | 4/2017 | |
| WO | 2019/189042 | A1 | 10/2019 | |
| WO | 2020/054762 | A1 | 3/2020 | |
| WO | 2021/095885 | A1 | 5/2021 | |
| WO | WO-2022030395 | A1 * | 2/2022 | B60J 1/00 |
| WO | WO-2025124732 | A1 * | 6/2025 | C03C 17/3681 |
| WO | WO-2025170427 | A1 * | 8/2025 | C08J 5/18 |
| WO | WO-2026052482 | A1 * | 3/2026 | H01Q 15/0013 |

* cited by examiner

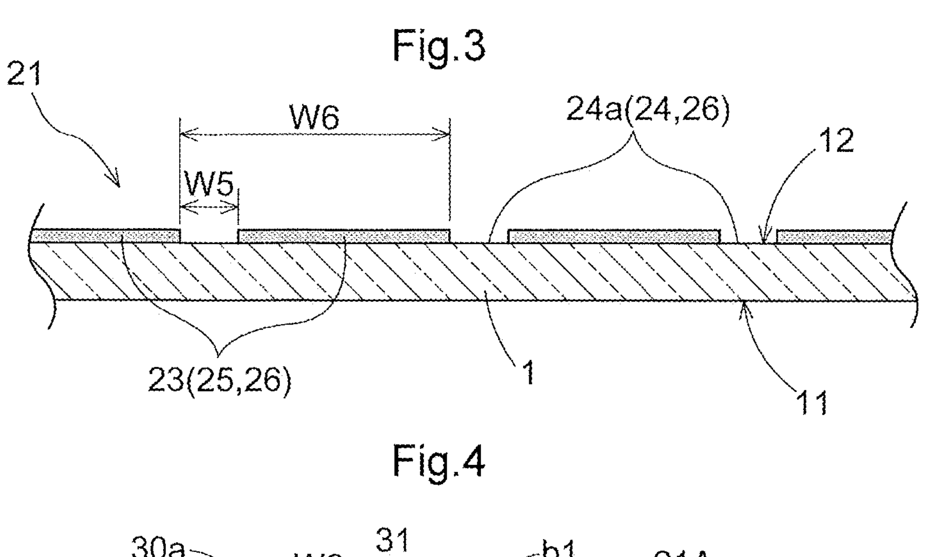
Fig.4
30a
W3
31
b1
21A
a2
a1
W1
W4
W2
22
b2
Fig.5
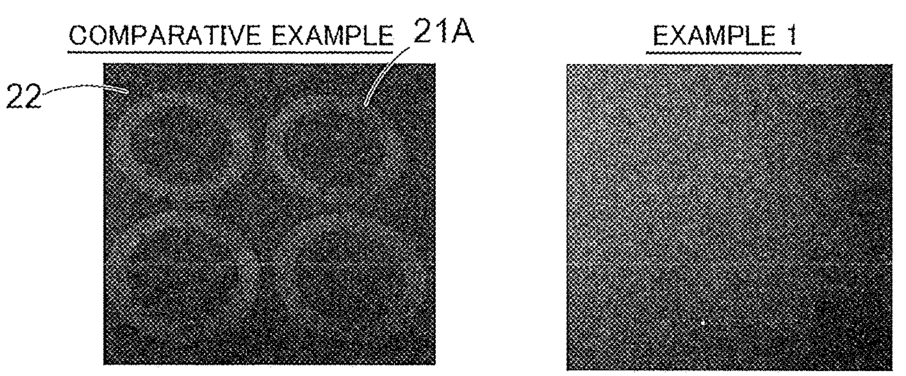

(a)
(b)
(c)
(d)
(e)
(f)
(g)
(h)
(i)
(j)
21
22

GLASS BODY HAVING ENHANCED HEAT INSULATING PERFORMANCE

This application is the National Stage Application of PCT/JP2022/029090, filed on Jul. 28, 2022, which claims priority to Japanese Patent Application No. 2021-144789, filed on Sep. 6, 2021, which is incorporated by reference for all purposes as if fully set forth herein.

TECHNICAL FIELD

The present invention relates to a glass body.

BACKGROUND ART

A glass body having a heat insulating property or a heat blocking property is known in which a Low-E film (low radiation film) is formed on a plate surface of a window glass of a vehicle or a building (refer to, for example, Patent Literature 1). The Low-E film has a problem in that the transmissivity is low (having a blocking property) with respect to radio waves in a frequency band of several hundreds of MHz to several tens of GHz.

Thus, in a glass body described in Patent Literature 2, an opening portion constituted by a plurality of parallel lines is provided in a Low-E film, and the ratio of the length of the plurality of lines to the area of the Low-E film is defined, whereby the radio wave transmissivity is enhanced with respect to radio waves in a frequency band of several hundreds of MHz to several tens of GHz.

In addition, in a glass body described in Patent Literature 3, a plurality of discontinuous islands is provided in a first film region having the Low-E film, and the first film region has radio wave transmissivity. In addition, Patent Literature 3 discloses an embodiment of a multilayer glass panel in which a first film region is provided on a second surface of a first glass plate, and an antenna is provided at a position facing the first film region of a fourth surface of a second glass plate.

CITATION LIST

Patent Literature

Patent Literature 1: JP2000-226235 A
Patent Literature 2: WO2020/054762
Patent Literature 3: WO2021/095885

SUMMARY

Technical Problem

The opening portion described in Patent Literature 2 and the first film region described in Patent Literature 3 are set to a shape that guarantees the radio wave transmissivity as a radio wave transmission region. In particular, in the opening portion described in Patent Literature 2 the plurality of parallel lines is provided on the conductive film (Low-E film). Therefore, the opening portion is likely to be visually recognized as a striped pattern, which has a large influence on the appearance. In addition, in the opening portion described in Patent Literature 2 or the first film region described in Patent Literature 3, the opening area is secured by removing a large amount of the conductive film (Low-E film) in order to guarantee the radio wave transmissivity in a wide frequency band. Therefore, the performance (heat insulating property or heat blocking property, or radio wave blocking property) due to the conductive film is likely to be impaired in the glass body.

Thus, a glass body is desired in which a radio wave transmission region is inconspicuous in appearance and high performance due to a conductive film is capable of being maintained.

Solution to Problem

A characteristic configuration of a glass body according to the present invention is a glass body comprising a first glass plate configured to have a first surface and a second surface on an opposite side to the first surface. At least one plate surface of the first surface and the second surface includes a plurality of radio wave transmission regions through which radio waves are allowed to be transmitted and which is spaced apart from each other, and a conductive film region that is entirely coated with a conductive film having a blocking property for the radio waves around the radio wave transmission regions. A patterning part having a plurality of radio wave passage sections through which the radio waves are allowed to pass and which is spaced apart from each other, and a conductive film section in which the conductive film is formed between the radio wave passage sections adjacent to each other is formed in each of the radio wave transmission regions.

Since the radio wave intensity of the radio waves passing through the glass body is high in a range facing the region of the first glass plate without the conductive film, the reception sensitivity of the glass body for radio waves having a predetermined frequency band is improved. Therefore, in order to increase a radio wave reception area in the glass body, the conductive film does not need to be provided on the glass body. However, in that case, in the glass body, the performance (heat insulating property or heat blocking property, or radio wave blocking property) due to the conductive film is lost, and the performance due to the conductive film and the radio wave transmissivity are in a trade-off relationship.

Thus, in the glass body of the present configuration, the plurality of radio wave transmission regions through which the radio waves are allowed to be transmitted and which is spaced apart from each other, and the conductive film region that is entirely coated with the conductive film around the radio wave transmission regions are provided, and each of the radio wave transmission region has the plurality of radio wave passage sections through which the radio waves are allowed to pass and which is spaced apart from each other, and the conductive film section in which the conductive film is formed between the radio wave passage sections adjacent to each other. That is, even in the radio wave transmission region, high performance due to the conductive film is capable of being maintained by providing the conductive film section, and the radio wave transmissivity is capable of being enhanced by providing the plurality of radio wave passage sections in each of the plurality of radio wave transmission regions.

In addition, the patterning part having the plurality of radio wave passage sections and the conductive film section between the radio wave passage sections adjacent to each other is formed in the radio wave transmission region of the present configuration. That is, a portion (radio wave passage section) that does not have the conductive film and a portion (conductive film section) covered with the conductive film are mixed in a predetermined pattern in the radio wave transmission region. Accordingly, the influence on the appearance is capable of being reduced between the conductive film region and the radio wave transmission region. Moreover, the frequency selectivity is capable of being imparted by setting the shape of the patterning part. As a result, in the glass body, the radio wave transmission region is inconspicuous in appearance. Therefore, the appearance is improved, and it is possible to also have the frequency selectivity. In this way, the glass body is provided in which the radio wave transmission region is inconspicuous in appearance and high performance due to the conductive film is capable of being maintained.

As another characteristic configuration, each of the radio wave transmission regions has a common symmetrical shape configured to transmit only the radio waves having a predetermined frequency band.

As in the present configuration, since each of the radio wave transmission regions has a common symmetrical shape, the radio wave passage section easily maintains the frequency selectivity of the radio waves to be transmitted. Accordingly, it is possible to form an optimal radio wave transmission region for radio waves having a predetermined frequency band.

As another characteristic configuration, a width of the conductive film region, which is a shortest distance between the radio wave transmission regions adjacent to each other, is even.

As in the present configuration, since the width of the conductive film region (conductive film), which is the shortest distance between the plurality of the radio wave transmission regions adjacent to each other, is even, it is possible to make the performance due to the conductive film and the radio wave transmissivity appropriately compatible with each other.

As another characteristic configuration, the width of the conductive film region, which is the shortest distance between the radio wave transmission regions adjacent to each other, is 0.5 mm or more and 10 mm or less.

As in the present configuration, if the width of the conductive film region, which is the shortest distance between the radio wave transmission regions adjacent to each other, is 0.5 mm or more and 10 mm or less, the influence on the appearance is capable of being reduced while guaranteeing the radio wave transmissivity. If the width of the conductive film region, which is the shortest distance between the radio wave transmission regions adjacent to each other, is smaller than 0.5 mm, the performance due to the conductive film deteriorates, and if the width is larger than 10 mm, the radio wave transmissivity is likely to deteriorate.

As another characteristic configuration, a maximum length of a line segment passing through a center of the radio wave transmission region is 0.5 mm or more and 30 mm or less.

As in the present configuration, if the maximum length of the line segment passing through the center of the radio wave transmission region is 0.5 mm or more and 30 mm or less, it is possible to reduce the influence on the appearance while guaranteeing the radio wave transmissivity. If the maximum length of the line segment passing through the center is smaller than 0.5 mm, the radio wave transmissivity deteriorates, and if the maximum length is larger than 30 mm, the performance due to the conductive film is likely to deteriorate.

As another characteristic configuration, the patterning part has the radio wave passage sections formed with fine wires having a wire width of 1 μm or more and 100 μm or less, and an interval between the fine wires adjacent to each other is 200 μm or more and 3 mm or less.

As in the present configuration, if the patterning part has the radio wave passage sections formed with fine wires having a wire width of 1 μm or more and 100 μm or less, and an interval between the fine wires adjacent to each other is 200 μm or more and 3 mm or less, the influence on the appearance can be reduced while guaranteeing the radio wave transmissivity. If the wire width of the fine wires is smaller than 1 μm, the radio wave transmissivity deteriorates, and if the wire width is larger than 100 μm, the performance due to the conductive film is likely to deteriorate. In addition, if the distance between the adjacent fine wires is smaller than 200 μm, the patterning part is likely to be visually recognized in appearance, and the performance due to the conductive film deteriorates, and if the distance is larger than 3 mm, the radio wave transmissivity is likely to deteriorate.

As another characteristic configuration, a plurality of the fine wires is formed parallel to or in concentric circles with an outline of the radio wave transmission region.

As in the present configuration, if the plurality of fine wires is formed to be parallel to or concentric with the outline of the radio wave transmission region, the radio wave transmission region has easy patterning processing and has improved radio wave transmissivity in a predetermined frequency band.

As another characteristic configuration, the radio wave transmission region is annular.

As in the case of the present configuration, if the radio wave transmission region is annular, it is possible to configure the glass body that has improved radio wave transmissivity for radio waves having a desired frequency band and has frequency selectivity to transmit only a desired frequency band.

As another characteristic configuration, a visible light transmittance of the radio wave transmission region is set to be 1.1 times or less of a visible light transmittance of the conductive film region.

As in the present configuration, if the visible light transmittance of the radio wave transmission region is 1.1 times or less of the visible light transmittance of the conductive film region, the influence on the appearance between the conductive film region and the radio wave transmission region is capable of being reliably reduced.

As another characteristic configuration, the conductive film is a Low-E film.

If the conductive film is the Low-E film as in the present configuration, the radio wave transmissivity is capable of being guaranteed while enhancing the heat insulating performance or the heat blocking performance.

As another characteristic configuration, the glass body further comprises a second glass plate configured to have a third surface facing the second surface and a fourth surface on an opposite side to the third surface; and a spacer configured to be in contact with the second surface and the third surface and to form a void layer between the first glass plate and the second glass plate. The radio wave transmission region is formed on the second surface or the third surface.

In the multilayer glass as in the present configuration, if the Low-E film is disposed on the second surface of the first glass plate or the third surface of the second glass plate, the heat insulating performance is enhanced. In the glass body having enhanced heat insulating performance, if the radio wave transmission region is formed on the second surface or the third surface, the significance is capable of being enhanced by adopting the glass body having the above configuration.

BRIEF DESCRIPTION OF DRAWINGS

FIG. 3 is a sectional view taken along line III-III in FIG. 2;

FIG. 4 is a view illustrating Comparative Example;

FIG. 5 is a view illustrating captured appearance images of Example 1 and Comparative Example;

DESCRIPTION OF EMBODIMENTS

Hereinafter, embodiments of a glass body according to the present invention will be described with reference to the drawings. However, the present invention is not limited to the following embodiments, and it is possible to make various modifications without departing from the spirit of the embodiment.

A glass body 100 in the present embodiment is capable of being used for various purposes. The glass body 100 is capable of being used, for example, as a window glass of a building or a window glass of a moving body such as an automobile, an aircraft, a ship, or a train. The glass body 100 may be a window glass that comes into contact with the outside air or may be a window glass that partitions a room.

Figure 1:
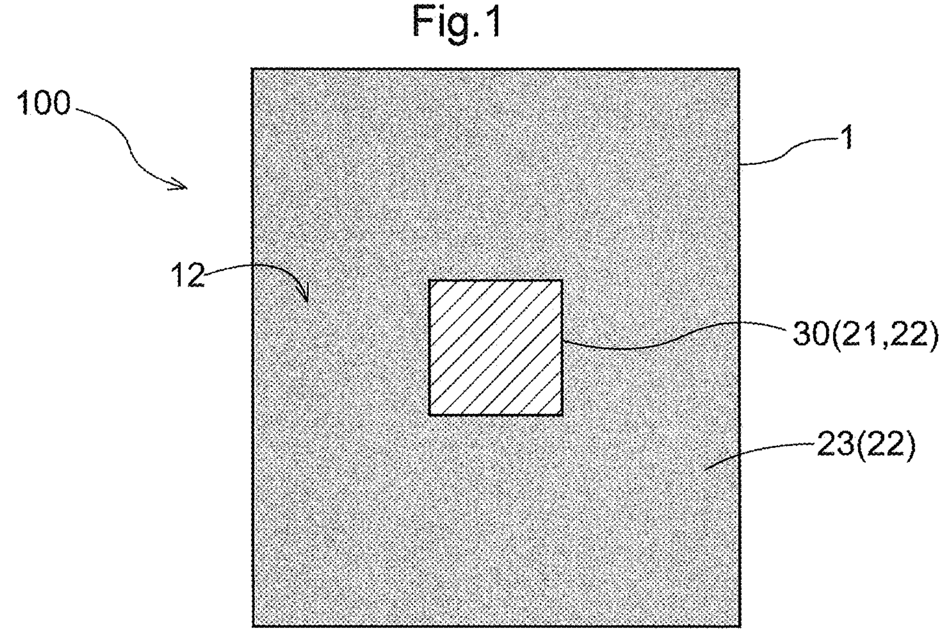
FIG. 1 is a plan view of a glass body of a first embodiment.

As illustrated in FIG. 1, the glass body 100 includes a first glass plate 1 having a rectangular outer shape on a plate surface. The glass body 100 includes a radio wave transmission region 21 through which radio waves corresponding to a 4G or 5G frequency band of 700 MHz to 30 GHz (wavelength of 428 mm to 10 mm) having linearity are allowed to be transmitted, and a conductive film region 22 in which a Low-E film 23 (an example of a conductive film) is formed around the radio wave transmission region 21.

First Embodiment: Single Plate Glass

Figure 2:
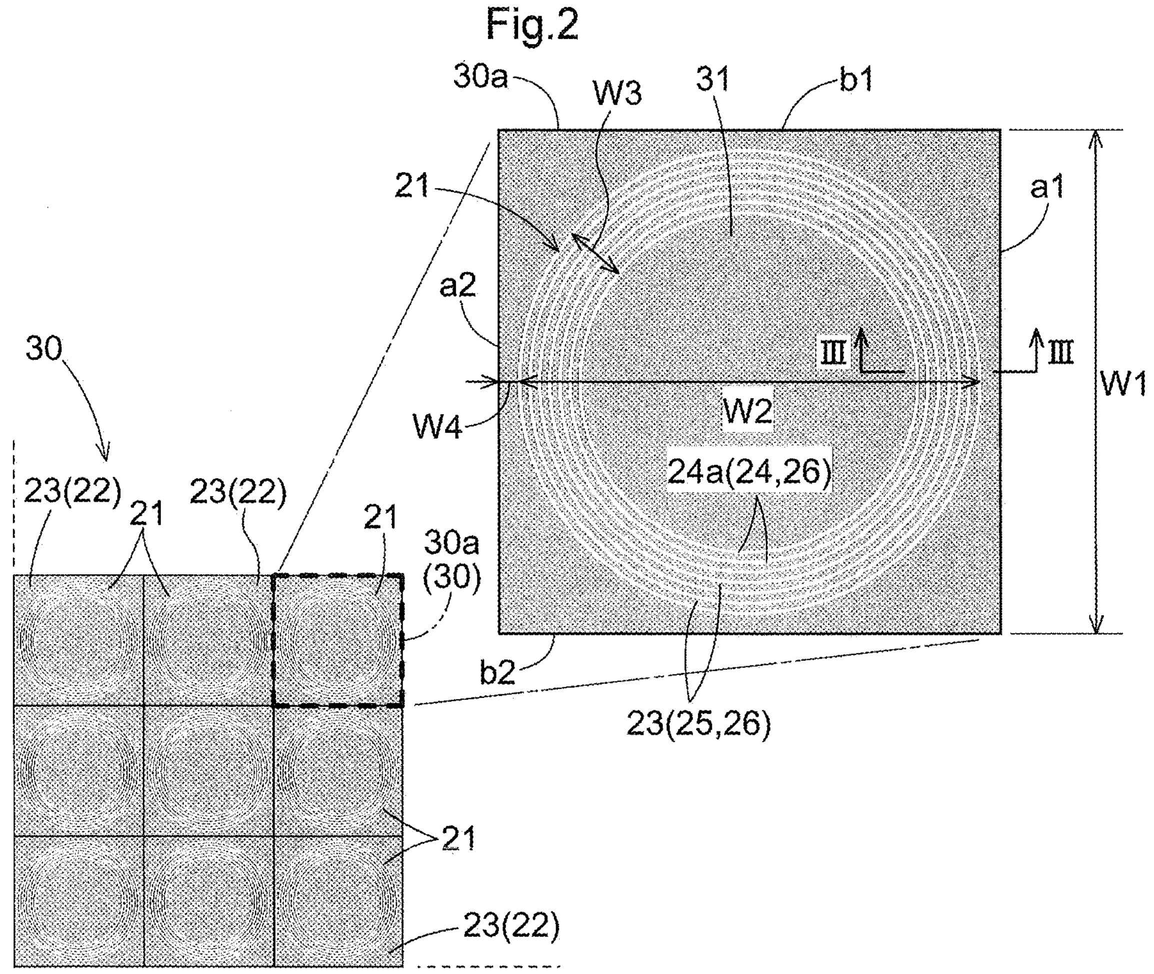
FIG. 2 is a plan view illustrating a radio wave transmission region.

As illustrated in FIG. 3, the first glass plate 1 has a first surface 11 and a second surface 12 on the opposite side to the first surface 11. The Low-E film 23 (an example of a conductive film) having a radio wave blocking property is formed on at least one plate surface of the first surface 11 and the second surface 12 of the first glass plate 1. In FIGS. 1 to 3, the Low-E film 23 is formed on the second surface 12 of the first glass plate 1. The Low-E film 23 is a conductive thin film having a radio wave blocking property. The surface resistivity of the conductive thin film is preferably less than 20Ω. By doing this way, the Low-E film 23 has a high reflectivity in a wavelength range from an infrared region to a radio wave range (frequency band of several hundreds of MHz to several tens of GHz). For that reason, the plate surface of the first glass plate 1 on which the Low-E film 23 is formed has a low radio wave transmissivity but also has a low emissivity. The first glass plate 1 has the conductive film region 22 in which the Low-E film 23 is formed on the entire region on the second surface 12. In addition, a rectangular partition region 30 including a plurality of (nine in the drawing) the radio wave transmission regions 21 from which a part of the Low-E film 23 is removed by laser processing or the like is provided on a part (a central portion in the drawing) of the second surface 12 which is a plate surface on which the Low-E film 23 is formed. The plurality of radio wave transmission regions 21 is disposed to be spaced apart from each other in the partition region 30. Each radio wave transmission region 21 is disposed to be capable of transmitting radio waves corresponding to 700 MHz to 3.5 GHz (wavelength of 428 mm to 85 mm), which is a 4G frequency band having linearity, and a 5G frequency band of 3.6 GHz to 30 GHz (wavelength of 83 mm to 10 mm). Details of the radio wave transmission region 21 will be described below. The conductive film region 22 and the radio wave transmission region 21 may be provided on the first surface 11 of the first glass plate 1.

The material of the first glass plate 1 (the same applies to the second glass plate 2 to be described below) is not particularly limited, and a known glass plate is capable of being used. For example, various glass plates such as heat ray absorbing glass, clear glass, green glass, UV green glass, and soda lime glass are capable of being used. The thickness of the first glass plate 1 is not particularly limited, but is, for example, preferably 2 to 15 mm, and more preferably 2.5 to 8 mm.

<Low-E Film>

The Low-E film 23 is not particularly limited as long as the Low-E film does not impair the object of the present invention but is preferably a multilayer film including a layer having silver as a main component. In addition, the Low-E film 23 is preferably formed of a multilayer in which two or more types of layers selected from a metal layer, a metal oxide layer, a metal nitride layer, and a metal oxynitride layer are laminated. A suitable example of the metal layer includes a silver layer. Suitable examples of the metal oxide layer include a tin oxide layer, a titanium oxide layer, or a zinc oxide layer. A suitable example of the metal nitride layer includes silicon nitride. A suitable example of the metal oxynitride layer includes silicon oxynitride. The Low-E film 23 is preferably formed by a vacuum film forming method such as a physical gas phase growth method (PVD) or the like, and particularly film formation using a sputtering method is preferable because a film is capable of being uniformly formed over a large area. The radio wave transmission region 21 is formed, for example, by forming the Low-E film 23 on a glass plate by the sputtering method and then removing the Low-E film 23 by the laser processing or the like. The radio wave transmission region 21 may be formed by using various masking materials. By forming the radio wave transmission region 21 by such a method, the radio wave transmission region 21 is capable of being easily disposed at a desired position of the glass plate.

In addition, the Low-E film 23 is more preferably formed of a multilayer obtained by laminating three or more types of layers selected from a tin oxide layer, a silicon nitride layer, a silicon oxynitride layer, a titanium oxide layer, a zinc oxide layer, and a silver layer, and is most preferably formed of three layers or five layers in which (1) the tin oxide layer (first anti-reflection layer), the zinc oxide layer (first anti-reflection layer), the silver layer (metal layer), the zinc oxide layer (second anti-reflection layer), and the tin oxide layer (second anti-reflection layer) or (2) the silicon nitride layer (first anti-reflection layer), the zinc oxide layer (first anti-reflection layer), the silver layer (metal layer), and the zinc oxide layer (second anti-reflection layer) are laminated sequentially from a glass plate surface.

The Low-E film 23 contains a metal layer having silver as a main component. The film thickness of the metal layer is preferably 5 nm or more and 15 nm or less, and more preferably 5 nm or more and 10 nm or less. The Low-E film 23 has a metal layer having a predetermined film thickness having silver as a main component, whereby heat radiation is capable of being suppressed. Accordingly, the glass body 100 is capable of improving the heat insulating performance. In addition, by setting the film thickness of the metal layer to 15 nm or less, the influence on the appearance due to the Low-E film 23 is capable of being reduced.

The Low-E film 23 has the first anti-reflection layer on a side close to a plate surface on which the Low-E film 23 is formed, which is the inside of the metal layer. The total optical film thickness of the first anti-reflection layer is suitably 20 nm or more and 120 nm or less. The Low-E film 23 has the second anti-reflection layer on a side far from the plate surface on which the Low-E film 23 is formed, which is the outside of the metal layer. The total optical film thickness of the second anti-reflection layer is suitably 60 nm or more and 120 nm or less. The optical film thickness is capable of being calculated by (Refractive index n)×(Film thickness d). In a case where the first anti-reflection layer (second anti-reflection layer) is constituted by a plurality of films, the total optical film thickness calculated for each film is the optical film thickness of the first anti-reflection layer (second anti-reflection layer). In calculating the optical film thickness, the value of the refractive index fluctuates depending on the wavelength of visible light. Here, the optical film thickness is based on a refractive index in a case where the wavelength of visible light is a reference wavelength (550 nm) in a general visible region.

As described above, in the Low-E film 23, the first anti-reflection layer having a predetermined film thickness is present on the side close to the second surface 12 of the first glass plate 1 with reference to the metal layer. Accordingly, the metal layer is protected and the Low-E film 23 has low reflection performance. As a result, heat is capable of being reliably blocked. In addition, the glass body 100 is capable of realizing high visible light transmittance and suitable reflection color tone.

In addition, in the Low-E film 23, even in a case where the second anti-reflection layer having a predetermined film thickness is present on the side far from the second surface 12 of the first glass plate 1 with reference to the metal layer, the metal layer is protected and the Low-E film 23 has low reflection performance. As a result, heat is capable of being reliably blocked. In addition, the glass body 100 is capable of realizing high visible light transmittance and suitable reflection color tone.

<Radio Wave Transmission Region>

In the present embodiment, as illustrated in FIGS. 1 and 2, the plurality of radio wave transmission regions 21 is disposed at the center of the second surface 12 of the first glass plate 1. The plurality of radio wave transmission regions 21 is disposed on the top and bottom and left and right on the second surface 12. The plurality of radio wave transmission regions 21 each has a common symmetrical shape and is configured to transmit only radio waves having a predetermined frequency band (for example, an optional frequency band selected from a frequency band (700 MHz to 30 GHz) of 4G, 5G, or the like). As illustrated in FIG. 2, in the present embodiment, each of the radio wave transmission regions 21 is formed in an annular shape. The Low-E film 23 remains in an inner region 31 located inside the annular radio wave transmission region 21. Since the radio wave transmission regions 21 each has a common symmetrical shape, a radio wave passage section 24, which will be described below, easily maintains the frequency selectivity of the radio waves to be transmitted. Accordingly, it is possible to form an optimal radio wave transmission region 21 for radio waves having a predetermined frequency band. In addition, if the radio wave transmission region 21 is annular, the radio wave transmissivity for radio waves having a desired frequency band (for example, an optional value selected from 3 GHz to 5 GHz) is improved. As a result, it is possible to configure the glass body 100 having the frequency selectivity of transmitting only a desired frequency band. If the glass body 100 having the frequency selectivity is provided on the window glass of a room with high airtightness in this way, radio waves other than a specific frequency band are not passed. Therefore, leakage of confidential information is capable of being prevented.

As illustrated in FIG. 2, a patterning part 26 having a plurality of the radio wave passage sections 24 through which radio waves are transmitted to pass and which is spaced apart from each other, and a conductive film section 25 in which the Low-E film 23 is formed between the radio wave passage sections 24 adjacent to each other is formed in the annular radio wave transmission region 21. In the patterning part 26, the radio wave passage sections 24 are formed of a plurality of fine wires **24*a*. Each fine wire 24*a* is formed between the conductive film sections 25 adjacent to each other, for example, by forming the Low-E film 23 on a glass plate by the sputtering method and then removing only the Low-E film 23 by the laser processing or the like. If the fine wires 24*a* are formed in this way, the glass plate is not scratched and the fine wires 24*a*** are capable of being made inconspicuous.

Each of the plurality of radio wave transmission regions 21 is disposed in a square unit section **30*a* having vertical sides a1 and a2 and horizontal sides b1 and b2. The unit section 30*a* includes the conductive film region 22 outside and inside (inner region 31) the radio wave transmission region 21. That is, the radio wave transmission region 21 is provided in a part of the unit section 30*a*, and the conductive film region 22 is a region in which the circumference of the radio wave transmission region 21 is entirely coated with the Low-E film 23 having a radio wave blocking property. In one unit section 30*a*, a length W1 of one side (side a1, a2, b1, or b2) is 1 mm or more and 40 mm or less, and preferably 3 mm or more and 15 mm or less. In one unit section 30*a*, the radio wave transmission region 21 has an outer diameter W2 that is less than a length W1 of one side and that is set to 0.5 mm or more and 30 mm or less, and preferably 1 mm or more and 10 mm or less. The outer diameter W2 corresponds to the maximum length of a line segment passing through the center of the radio wave transmission region 21. If the outer diameter W2 is smaller than 0.5 mm, the radio wave transmissivity deteriorates, and if the outer diameter W2 is larger than 30 mm, the performance due to the Low-E film 23 is likely to deteriorate. A wire width W3 of a curved portion including all the radio wave passage sections 24 and the conductive film sections 25** is 2 mm or more and 5 mm or less.

The shortest distance between the adjacent radio wave transmission regions 21 in the two unit sections **30*a* is twice a gap W4 between a side portion (for example, the vertical side a2) of the unit section 30***a* and an outer edge of the radio wave transmission region 21. The gap W4 is set to 0.25 mm or more and 5 mm or less, and preferably 0.5 mm or more and 3 mm or less, and the shortest distance (W4×2) is set to 0.5 mm or more and 10 mm or less, and preferably 1 mm or more and 6 mm or less. If the width (W4×2) of the conductive film region 22, which is the shortest distance between the radio wave transmission regions 21 adjacent to each other, is smaller than 0.5 mm, the performance due to the Low-E film 23 deteriorates, and if the width is larger than 10 mm, the radio wave transmissivity is likely to deteriorate. The plurality of radio wave transmission regions 21 is evenly distributed in the partition region 30. That is, in the partition region 30, the shortest distance (gap W4×2) of the radio wave transmission regions 21 adjacent to each other is even. Since the width of the conductive film region 22 (Low-E film 23), which is the shortest distance between the plurality of the radio wave transmission regions 21 adjacent to each other, is even, it is possible to make the performance due to the Low-E film 23 and the radio wave transmissivity appropriately compatible with each other.

A wire width W5 of the fine wire 24*a* constituting the radio wave passage section 24 is preferably 1 μm or more and 100 μm or less, and more preferably 5 μm or more and 30 μm or less. If the wire width W5 of the fine wire 24*a* is smaller than 1 μm, the radio wave transmissivity deteriorates, and if the wire width W5 is larger than 100 μm, the performance (heat insulating property or blocking property) of the Low-E film 23 is likely to deteriorate, and the fine wire 24*a* is likely to be visually recognized.

The interval (pitch) W6 of the fine wires 24*a* adjacent to each other in one radio wave transmission region 21 is preferably 200 μm or more and 3 mm or less, and more preferably 500 μm or more and 1 mm or less. If the distance W6 between the fine wires 24*a* adjacent to each other is smaller than 200 μm, the performance (heat insulating property or blocking property) of the Low-E film 23 is likely to deteriorate, and the fine wires 24*a* are likely to be visually recognized, and if the distance is larger than 3 mm, the radio wave transmissivity is likely to deteriorate.

In this way, in the glass body 100, the conductive film region 22 is formed on the second surface 12 of the first glass plate 1 by the Low-E film 23, and the conductive film section 25 is provided also in the radio wave transmission region 21 by the Low-E film 23. Accordingly, the high performance due to the Low-E film 23 is capable of being maintained. In addition, the radio wave transmissivity is enhanced by providing the plurality of radio wave passage sections 24 in each of the plurality of radio wave transmission regions 21. In this way, in the glass body 100, the radio wave transmission region 21 is inconspicuous in appearance, and the high performance due to the Low-E film 23 is capable of being maintained.

In addition, the patterning part 26 having the plurality of radio wave passage sections 24 and the conductive film section 25 between the radio wave passage sections 24 adjacent to each other is formed in the radio wave transmission region 21. That is, a portion (radio wave passage section 24) that does not have the Low-E film 23 (conductive film) and a portion (conductive film section 25) covered with the Low-E film 23 are mixed in a predetermined pattern in the radio wave transmission region 21. Accordingly, the influence on the appearance is capable of being reduced between the conductive film region 22 and the radio wave transmission region 21. As a result, in the glass body 100, the radio wave transmission region 21 is inconspicuous in appearance. Therefore, the appearance is improved. Moreover, the frequency selectivity is capable of being imparted by setting the shape of the patterning part 26.

In the present embodiment, the radio wave transmission region 21 is annular, and the plurality of fine wires 24*a* is formed in a concentric shape along the outer shape of the radio wave transmission region 21. If the radio wave transmission region 21 is annular, the glass body 100 has improved radio wave transmissivity for radio waves having a desired frequency band and has frequency selectivity to transmit only a desired frequency band. The plurality of fine wires 24*a* may be formed in one of a left-right direction (direction along the horizontal sides b1 and b2 of the cell) and an up-down direction (direction along the vertical sides a1 and a2 of the cell) or at predetermined intervals in the radio wave transmission region 21. In addition, in a case where the plurality of fine wires 24*a* is formed in both the left-right direction and the up-down direction, the fine wires 24*a* may be perpendicular to each other. If the plurality of fine wires 24*a* is formed to be parallel to or concentric with the outline of the radio wave transmission region 21, the radio wave transmission region 21 has easy patterning processing and has improved radio wave transmissivity in a predetermined frequency band.

The visible light transmittance of the radio wave transmission region 21 is preferably set to be, for example, 1.1 times or less the visible light transmittance of the conductive film region 22. If the visible light transmittance of the radio wave transmission region 21 is 1.1 times or less of the visible light transmittance of the conductive film region 22, the influence on the appearance between the conductive film region 22 and the radio wave transmission region 21 is capable of being reliably reduced in the glass body 100.

<Evaluation Test> (Test Conditions)

Soda lime glass in which the plate surface of the first glass plate 1 is 50 cm×50 cm and the thickness of the first glass plate 1 is 6 mm was used, and the Low-E film 23 covering the second surface 12 had a total film thickness of 80 nm and an emissivity of 0.1 with $SnO_2$/ZnO/Ag/SUS/ZnO/$SnO_2$ from the second surface 12 side of the first glass plate 1. The laser processing conditions for removing the Low-E film 23 were such that a repetition frequency of 100 kHz, a wavelength of 355 nm, and an operation speed of 300 mm/sec were set by using a YAG:Nd laser so that only the Low-E film 23 was capable of being removed without removing the glass.

In Example 1, the annular radio wave transmission region 21 illustrated in FIG. 2 was formed on the entire surface of the second surface 12 of the first glass plate 1. In the radio wave transmission region 21 of Example 1, the outer diameter W2 was set to 22.5 mm, the width W3 of the annular portion was set to 3 mm, the width W5 of the fine wire 24*a* was set to 10 μm, and the interval W6 (pitch) of the fine wires 24*a* adjacent to each other was set to 500 μm. In Comparative Example, as illustrated in FIG. 4, the entire Low-E film 23 is removed in a radio wave transmission region 21A. That is, the radio wave transmission region 21A of Comparative Example has the same outer shape as the radio wave transmission region 21 of Example 1 but has a configuration different from that of Example 1 in that the conductive film section 25 (Low-E film 23) is not provided. In Comparative Example, the configuration except for the radio wave transmission region 21A is the same as that of Example 1.

Table 1 below shows, in Example 1 and Comparative Example, the outer diameter W2 and the inner diameter of the radio wave transmission region 21 (21A), the gap (W4×2) of the radio wave transmission regions 21 (21A)

adjacent to each other, the wire width (Example 1: W5, Comparative Example: W3), the number of wires, the interval (pitch) W6 of the fine wires 24*a*, and the residual ratio of the conductive film (Low-E film 23) on the second surface 12 of the first glass plate 1.

TABLE 1

| | Outer diameter W2 | Inner diameter | Gap W4 × 2 | Wire width | Number of wires | Interval W6 | Residual rate of conductive film |
|---|---|---|---|---|---|---|---|
| Example 1 | 22.5 mm | 16.5 mm | 2 mm | 10 μm | 7 | 0.5 mm | 99% |
| Comparative Example | 22.5 mm | 16.5 mm | 2 mm | 3 mm | 1 | — | 77% |

(Appearance)

The glass body of each of Example 1 and Comparative Example was placed on a black felt, and the second surface 12 of the glass body of each of Example 1 and Comparative Example was captured with a camera. FIG. 5 illustrates captured images of Example 1 and Comparative Example. As illustrated in FIG. 5, in Comparative Example, there was a large difference between the color tone of the radio wave transmission region 21A and the color tone of the conductive film region 22. Therefore, the shape of the radio wave transmission region 21A was capable of being easily visually recognized, which gave a conspicuous impression. It is considered that the reason for this is because, in Comparative Example, the wire width W3 of the radio wave transmission region 21A is wide and the removal area of the Low-E film 23 is large (that is, the residual ratio of the Low-E film 23 is small). On the other hand, in Example 1, since the color tone of the radio wave transmission region 21 was close to that of the adjacent conductive film region 22, the shape was not capable of being almost visually recognized, which gave an inconspicuous impression. It is considered that this is because, in Example 1, the wire width W5 of the fine wire 24*a* is narrow and the removal area of the Low-E film 23 is small (that is, the residual ratio of the Low-E film 23 is large). The visible light transmittance (average) of the radio wave transmission region 21A in Comparative Example was 1.53 times the visible light transmittance (average) of the conductive film region 22, and the visible light transmittance (average) of the radio wave transmission region 21 in Example 1 was 1.01 times the visible light transmittance (average) of the conductive film region 22.

(Radio Wave Transmissivity)

The radio wave transmission characteristics of Example 1 and Comparative Example were evaluated on the basis of a propagation loss (attenuation amount) (dB) of a glass plate (reference glass plate) that does not have the Low-E film 23. That is, the propagation loss (attenuation amount) (dB) of the glass plate that does not have the Low-E film 23 was set to 0 dB, and the propagation loss (attenuation amount) (dB) of the glass bodies of Example 1 and Comparative Example was measured under the following conditions. The frequency band of the radio waves used to measure the propagation loss (attenuation amount) (dB) was set to 0.7 to 8.5 GHz. The installation angle of the first glass plate 1 was perpendicular (90 degrees) to the ground. Both the distance between the first glass plate 1 and a transmitting antenna and the distance between the first glass plate 1 and a receiving antenna were set to 50 mm. The evaluation results of the radio wave transmission characteristics (propagation loss) with respect to the frequency of the radio waves is illustrated in the graph of FIG. 6.

Figure 6:
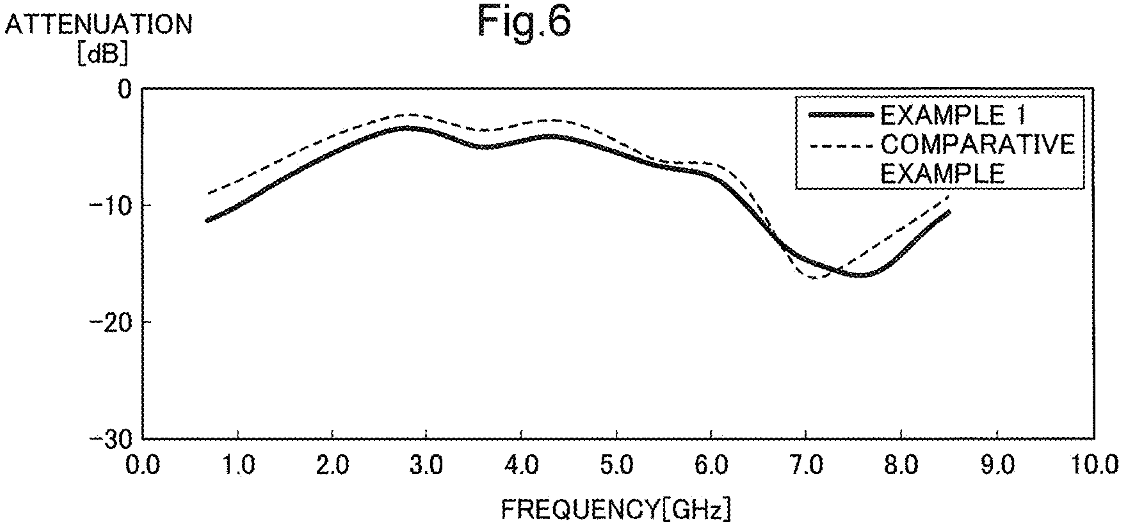
FIG. 6 is a graph illustrating attenuation amount with respect to frequency in Example 1 and Comparative Example.

As illustrated in the graph of FIG. 6, a difference in propagation loss (attenuation amount) (dB) between Comparative Example and Example 1 is small irrespective of a large difference in the residual ratio of the conductive film (Low-E film 23). Incidentally, when the frequency of the radio waves is 3 GHz, the attenuation amount of Comparative Example is −2.3 (dB), the attenuation amount of Example 1 is −3.6 dB, and the attenuation rate of Example 1 is larger than that in Comparative Example 1. On the other hand, when the frequency of the radio waves is 7 GHz, the attenuation amount of Comparative Example is −16.1 (dB) and −14.5 (dB) in Example 1, and the attenuation amount in Example 1 is smaller than that in Comparative Example 1.

In this way, it was confirmed that Example 1 has sufficient radio wave transmission characteristics as in Comparative Example and there is no large difference in the frequency selection characteristics of the radio waves between Comparative Example and Example 1. Therefore, as in Example 1, the radio wave transmission region 21 has a fine wire pattern, whereby the radio wave transmission region 21, including the frequency selectivity of the radio waves, with significantly improved appearance is capable of being formed in the glass body 100 without significantly impairing the frequency selection characteristics of the radio waves.

In addition to Example 1, Examples 2 and 3 in which the outer diameter W2 of the radio wave transmission region 21 of Example 1 was increased or decreased were prepared, and the attenuation of radio waves within a predetermined range of frequencies was calculated for Examples 1 to 3 by using simulation software (Diffract MOD). In Example 2, the outer diameter W2 of the radio wave transmission region 21 is 22.0 mm, which is 0.5 mm smaller than that of Example 1. The radio wave transmission region 21 of Example 3 was set to have an outer diameter W2 of 23.0 mm, which is 0.5 mm larger than that of Example 1. Other configurations of Example 2 and Example 3 are the same as those of Example 1.

Figure 7:
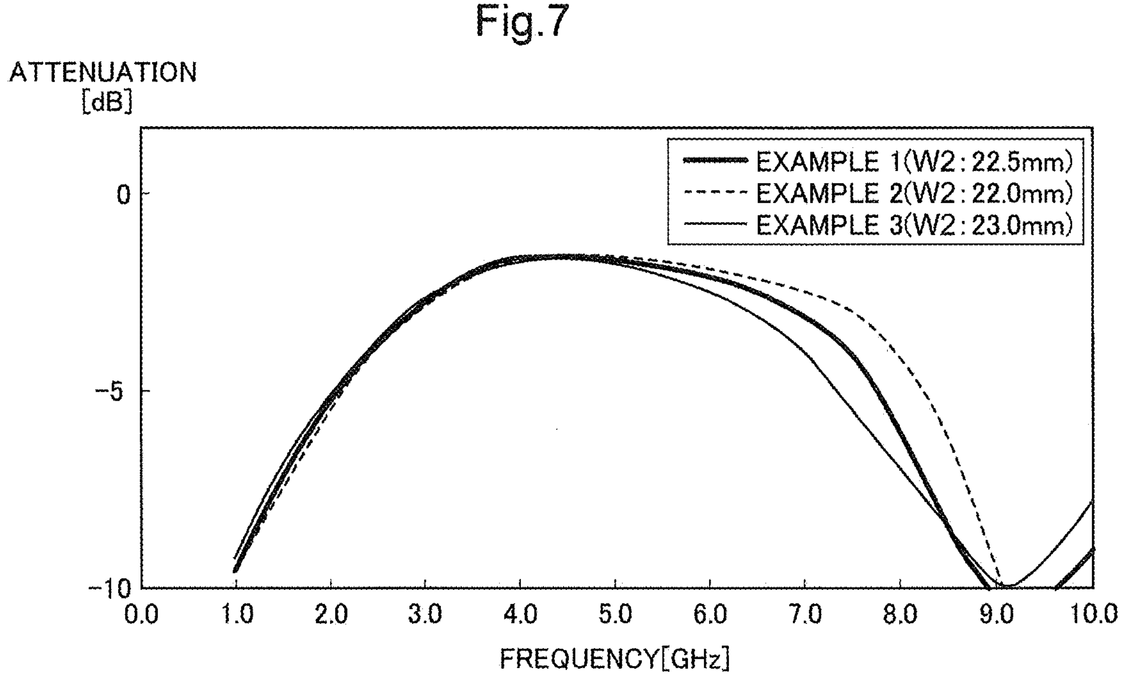
FIG. 7 is a graph illustrating the attenuation amount with respect to frequency in Examples 1 to 3.

The evaluation results of the radio wave transmission characteristics (propagation loss) of Example 1, Example 2, and Example 3 are illustrated in the graph of FIG. 7. Regarding Example 1, Example 2, and Example 3, the propagation loss was the same up to a frequency band of 5 GHz. However, in radio waves having a frequency of 5 to 8 GHz, according to the attenuation calculation, Example 2 with the smaller outer diameter W2 had the smallest propagation loss. It can be from these that, as long as the outer diameter W2 is in a range of 22 mm or more and 23 mm or less, the radio wave transmission region 21 has no difference in radio wave transmissivity with respect to an optional frequency band selected from 3 GHz to 5 GHz.

Second Embodiment: Multilayer Glass

Figure 8:
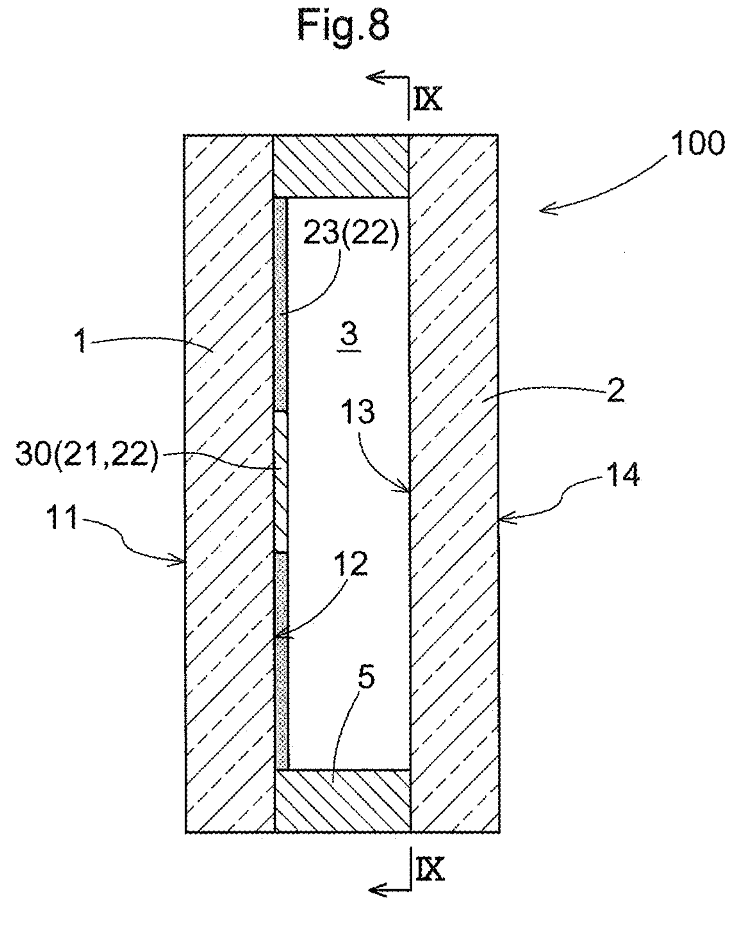
FIG. 8 is a sectional view of a glass body of a second embodiment.
Figure 9:
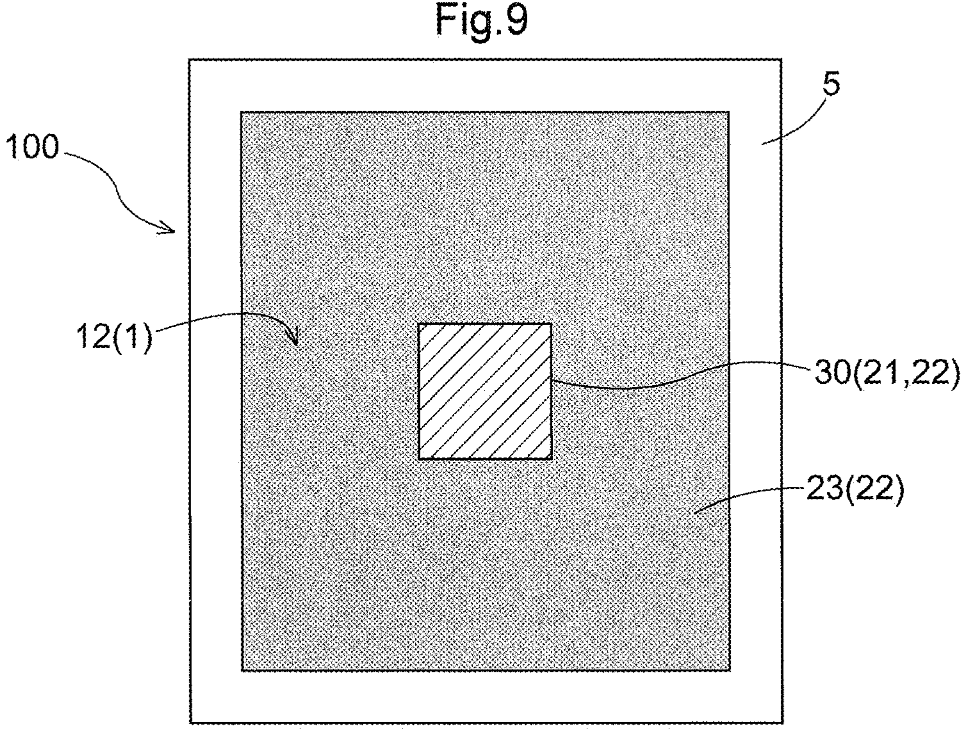
FIG. 9 is a sectional view taken along line IX-IX in FIG. 8.

As illustrated in FIGS. 8 and 9, a glass body 100 of the second embodiment is a multilayer glass having two glass plates, that is, a first glass plate 1 and a second glass plate 2 of which the plate surfaces have substantially the same rectangular outer shape. The pair of glass plates 1 and 2 is coupled to each other by a spacer 5 disposed on peripheral edge portions thereof. A void layer 3 is formed between the pair of glass plates 1 and 2 by the spacer 5. The first glass plate 1 has the first surface 11 which is a plate surface on the outdoor side, and a second surface 12 which is a plate surface on the void layer 3 side on the opposite side to the first surface 11. The second glass plate 2 has a third surface 13 which is a plate surface on the void layer 3 side and a fourth surface 14 which is a plate surface on the indoor side on the opposite side to the third surface 13. That is, the spacer 5 is in contact with the second surface 12 and the third surface 13. The Low-E film 23 (an example of the conductive film) having a radio wave blocking property is formed on a plate surface (second surface 12) on the void layer 3 side. Although illustration is omitted, the void layer 3 is sealed by a frame in which a sealing material disposed outside the spacer 5 is disposed.

The first glass plate 1 has the conductive film region 22 in which the Low-E film 23 is formed on the entire region on the second surface 12. In addition, the second surface 12, which is a plate surface on which the Low-E film 23 is formed, is provided with the radio wave transmission region 21 in which a part of the Low-E film 23 is removed by the laser processing or the like. The radio wave transmission region 21 is disposed to enable transmission of radio waves corresponding to a frequency band of 700 MHz to 30 GHz (wavelength 428 mm to 10 mm) of 4G, 5G, or the like having linearity. In the multilayer glass as in the present embodiment, if the Low-E film 23 is disposed on the second surface 12 of the first glass plate 1 or the third surface 13 of the second glass plate 2, the heat insulating performance is enhanced. In addition, the conductive film region 22 and the radio wave transmission region 21 may be provided on the first surface 11 of the first glass plate 1 or the fourth surface 14 of the second glass plate 2. In addition, an antenna for transmitting and receiving radio waves (not illustrated) may be installed on a plate surface (fourth surface 14) on the indoor side of the glass body 100, or the antenna may be installed on a ceiling or the like in the room.

Figure 10:
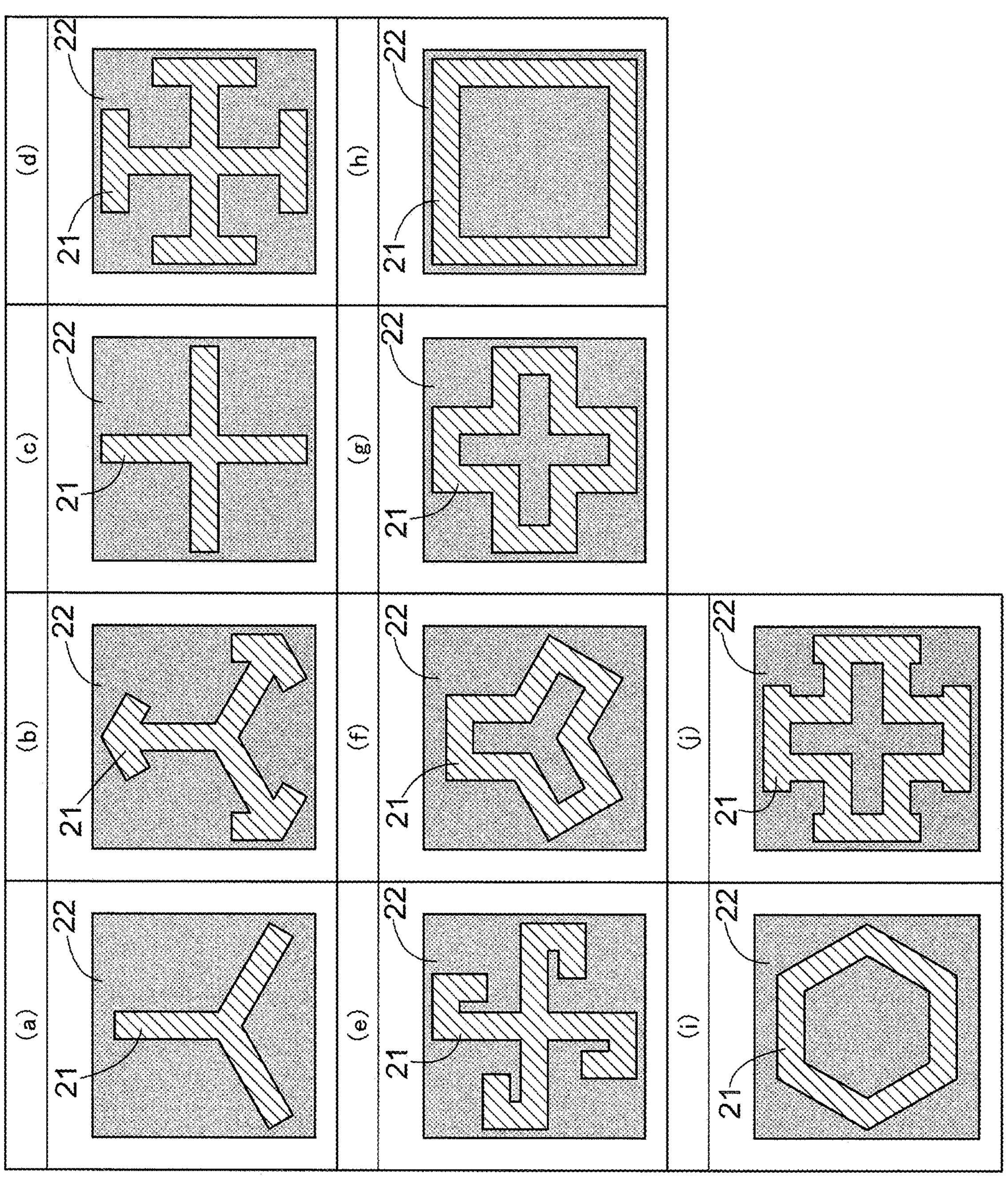
FIG. 10 is a view illustrating the shape of a radio wave transmission region having another form.

Other Embodiments (1) In the above embodiment, an example in which the shape of the radio wave transmission region 21 is annular is illustrated, but the shape of the radio wave transmission region 21 is not limited to the annular shape, and may be shapes illustrated in (a) to (j) of FIG. 10. Similar to the radio wave transmission region 21 illustrated in FIG. 2, the radio wave transmission regions 21 illustrated in (a) to (j) of FIG. 10 also have shapes formed with a constant wire width and are formed with the patterning parts 26 having the plurality of fine wires 24*a* and the conductive film section 25. In addition, the plurality of fine wires 24*a* may be formed in both the left-right direction and the up-down direction.

Among the shapes of the radio wave transmission regions 21 illustrated in FIG. 10, the radio wave transmission regions 21 including three lines each extending from the center to each apex of a triangle is common to (a) [Three legged] and (b) [Anchor]. Each radio wave transmission region 21 including a cross line is common to (c) [Cross], (d) [Jerusalem cross], and (e) [Square spiral]. The radio wave transmission regions 21 being annular is common to (f) [Three legged loaded], (g) [Four legged loaded], (h) [Square loop], (i) [Hexagonal loop], and (j) [Mixed (d) and (g)]. In a case where the outer shapes of the radio wave transmission regions 21 are linear, the plurality of fine wires 24*a* is capable of being formed parallel to the outlines of the radio wave transmission regions 21. The radio wave transmission regions 21 illustrated in FIG. 10 also have high radio wave transmissivity with respect to a specific frequency band and have frequency selectivity to transmit only the specific frequency band.

(2) In the radio wave transmission region 21, it is not necessary to remove the Low-E film 23 to expose the glass plate, and it is sufficient as long as at least the metal layer having silver as a main component is removed.

(3) In the multilayer glass in the second embodiment, a heat blocking film may be disposed on the second surface 12 of the first glass plate 1 and the Low-E film 23 may be disposed on the third surface 13 of the second glass plate 2. The heat blocking film is preferably a multilayer film including a layer having titanium nitride as a main component. A suitable example of the metal nitride layer includes a titanium nitride layer. The film thickness of the heat blocking film is appropriately selected depending on the types of the films to be laminated, but is usually 5 to 100 nm, and preferably 10 to 50 nm. The heat blocking film is constituted by, for example, a heat ray absorbing film. If the heat blocking film is the heat ray absorbing film, infrared rays are capable of being absorbed by the heat blocking film. Thus, the heat blocking property is capable of being improved in the glass body 100.

INDUSTRIAL APPLICABILITY

The present invention is capable of being used for a glass body as a window glass of a building or a window glass of a moving body such as an automobile, an aircraft, a ship, or a train.

REFERENCE SIGNS LIST

1: first glass plate
2: second glass plate
3: void layer
5: spacer
11: first surface
12: second surface
13: third surface
14: fourth surface
21: radio wave transmission region
22: conductive film region
23: Low-E film (conductive film)
24: radio wave passage section
24*a*: fine wire
25: conductive film section
26: patterning part
30: partition region
30*a*: unit section
100: glass body
W2: outer diameter
W3: wire width
W4: gap
W5: wire width

The invention claimed is:

1. A glass body, comprising:

a first glass plate configured to have a first surface and a second surface on an opposite side to the first surface, wherein at least one plate surface of the first surface and the second surface includes a plurality of radio wave transmission regions through which radio waves corresponding to 3.5 GHz to 30 GHz are allowed to be transmitted and which is spaced apart from each other, and a conductive film region that is entirely coated with a conductive film having a blocking property for the radio waves around the radio wave transmission regions, the conductive film is a Low-E film, a patterning part having a plurality of radio wave passage sections through which the radio waves are allowed to pass and which is spaced apart from each other, and a conductive film section in which the conductive film is formed between the radio wave passage sections adjacent to each other is formed in each of the radio wave transmission regions, and each of the radio wave passage sections is formed of fine wires having a width of 5 μm or more and 30 μm or less, a width of the patterning part is 2 mm or more and 5 mm or less, and an interval of the fine wires adjacent to each other is 500 μm or more and 1 mm or less.

2. The glass body according to claim 1, wherein each of the radio wave transmission regions has a common symmetrical shape configured to transmit only the radio waves having a predetermined frequency band.

3. The glass body according to claim 1, wherein a width of the conductive film region, which is a shortest distance between the radio wave transmission regions adjacent to each other, is equal.

4. The glass body according to claim 3, wherein the width of the conductive film region, which is the shortest distance between the radio wave transmission regions adjacent to each other, is 0.5 mm or more and 10 mm or less.

5. The glass body according to claim 1, wherein a maximum length of a line segment passing through a center of the radio wave transmission region is 0.5 mm or more and 30 mm or less.

6. The glass body according to claim 1, wherein a plurality of the fine wires is formed parallel to or in concentric circles with an outline of the radio wave transmission region.

7. The glass body according to claim 1, wherein the radio wave transmission region is annular.

8. The glass body according to claim 1, wherein a visible light transmittance of the radio wave transmission region is set to be 1.1 times or less of a visible light transmittance of the conductive film region.

9. The glass body according to claim 1, further comprising:

a second glass plate configured to have a third surface facing the second surface and a fourth surface on an opposite side to the third surface; and a spacer configured to be in contact with the second surface and the third surface and to form a void layer between the first glass plate and the second glass plate, wherein the radio wave transmission region is formed on the second surface or the third surface.

* * * * *